US012620097B2

(12) United States Patent
Petkov

(10) Patent No.: US 12,620,097 B2
(45) Date of Patent: May 5, 2026

(54) TECHNIQUE FOR OPTIMIZING RENDERING PARAMETERS OF OVERLAYS OF MEDICAL IMAGES

(71) Applicant: SIEMENS HEALTHINEERS AG, Forchheim (DE)

(72) Inventor: Kaloian Petkov, Lawrenceville, NJ (US)

(73) Assignee: Siemens Healthineers AG, Forchheim (DE)

( * ) Notice: Subject to any disclaimer, the term of this patent is extended or adjusted under 35 U.S.C. 154(b) by 458 days.

(21) Appl. No.: 18/308,712

(22) Filed: Apr. 28, 2023

(65) Prior Publication Data

US 2023/0360214 A1 Nov. 9, 2023

(30) Foreign Application Priority Data

May 6, 2022 (EP) ..................................... 22171999

(51) Int. Cl.
G06T 7/00 (2017.01)
G06T 5/50 (2006.01)
(Continued)

(52) U.S. Cl.
CPC .............. G06T 7/0014 (2013.01); G06T 5/50 (2013.01); G06V 10/24 (2022.01); G06V 10/761 (2022.01);
(Continued)

(58) Field of Classification Search
CPC ..................... G06T 7/0014; G06T 5/50; G06T 2207/10024; G06T 2207/20221;
(Continued)

(56) References Cited

U.S. PATENT DOCUMENTS 6,246,784 B1 * 6/2001 Summers .............. G06T 7/0012
382/128
10,546,415 B2 1/2020 Petkov et al.
(Continued)

FOREIGN PATENT DOCUMENTS

| CN | 107403446 A | 11/2017 |
| CN | 113808227 A | 12/2021 |
| EP | 3462418 A1 | 4/2019 |

OTHER PUBLICATIONS

Gao, et al. "Generalizing Spatial Transformers to Projective Geometry with Applications to 2D/3D Registration," PubMed Jun. 5, 2022. Abstract.
(Continued)

*Primary Examiner* — Mekonen T Bekele

(57) ABSTRACT

An overlay of an aligned medical image obtained from a medical scanner is rendered with a reference image. The reference image has a reference structure of a body. An intermediate representation of the reference structure is determined. The medical image has structures corresponding to the reference structures, and an intermediate representation of the structures in the medical image is determined. A rendering parameter is optimized by comparing the intermediate representations of the medical image and of the reference image. The medical image is aligned and overlayed with the reference image based on the optimized rendering parameter, and the aligned and overlayed image is rendered.

18 Claims, 4 Drawing Sheets

(51) Int. Cl.
    *G06V 10/24*           (2022.01)
    *G06V 10/74*           (2022.01)
(52) U.S. Cl.
    CPC ............... *G06T 2207/10024* (2013.01); *G06T 2207/20221* (2013.01)
(58) Field of Classification Search
    CPC ..... G06T 19/00; G06T 2210/41; G06V 10/24; G06V 10/761
    See application file for complete search history.

(56)                References Cited

U.S. PATENT DOCUMENTS

| | | | |
|---|---|---|---|
| 10,565,774 | B2 | 2/2020 | Petkov |
| 11,557,036 | B2 | 1/2023 | Liao et al. |
| 2007/0238954 | A1 | 10/2007 | White et al. |
| 2018/0225861 | A1 | 8/2018 | Petkov et al. |
| 2018/0268541 | A1* | 9/2018 | Kruecker ............... G06F 3/017 |
| 2020/0258227 | A1 | 8/2020 | Liao et al. |

OTHER PUBLICATIONS

M. M. Loper and M. J. Black, "OpenDR: An Approximate Differentiable Renderer," Proceedings of ECCV, vol. 8695, pp. 154-169, 2014.

S. Zhao, W. Jakob and T.-M. Li, "Physics-based differentiable rendering: from theory to implementation," SIGGRAPH Courses, 2020.

T. Kroes, "Exposure Render: An Interactive Photo-Realistic Volume Rendering Framework," PLOS One, vol. 8, No. 4, 2012.

U.S. Appl. No. 17/653,516, filed Mar. 4, 2022.

U.S. Appl. No. 17/931,257, filed Sep. 12, 2022.

Weiss, et al. "Differentiable Direct Volume Rendering," IEEE Trans on Visualization and Computer Graphics, vol. 28, No. 1, pp. 562-572, Jan. 2022.

Gao Cong et al:"generalizing spatial transformers to projective geometry with applications to 2d/3d registration", medical image computing and computer assisted intervention MICCAI 2020, p. 329-339, Sep. 29, 2020.

* cited by examiner

200

202-2
202-4

204-1
204-2
204-3
204-4

Interface
Interface

Interface
Interface

Processing Unit
Processing Unit
Processing Unit
Processing Unit

Memory

Computing Device 202-1
202
202-3

204

206

100

S102 → S104 → S106 → S108 → S110 → S112 → S114 → S116 → S118

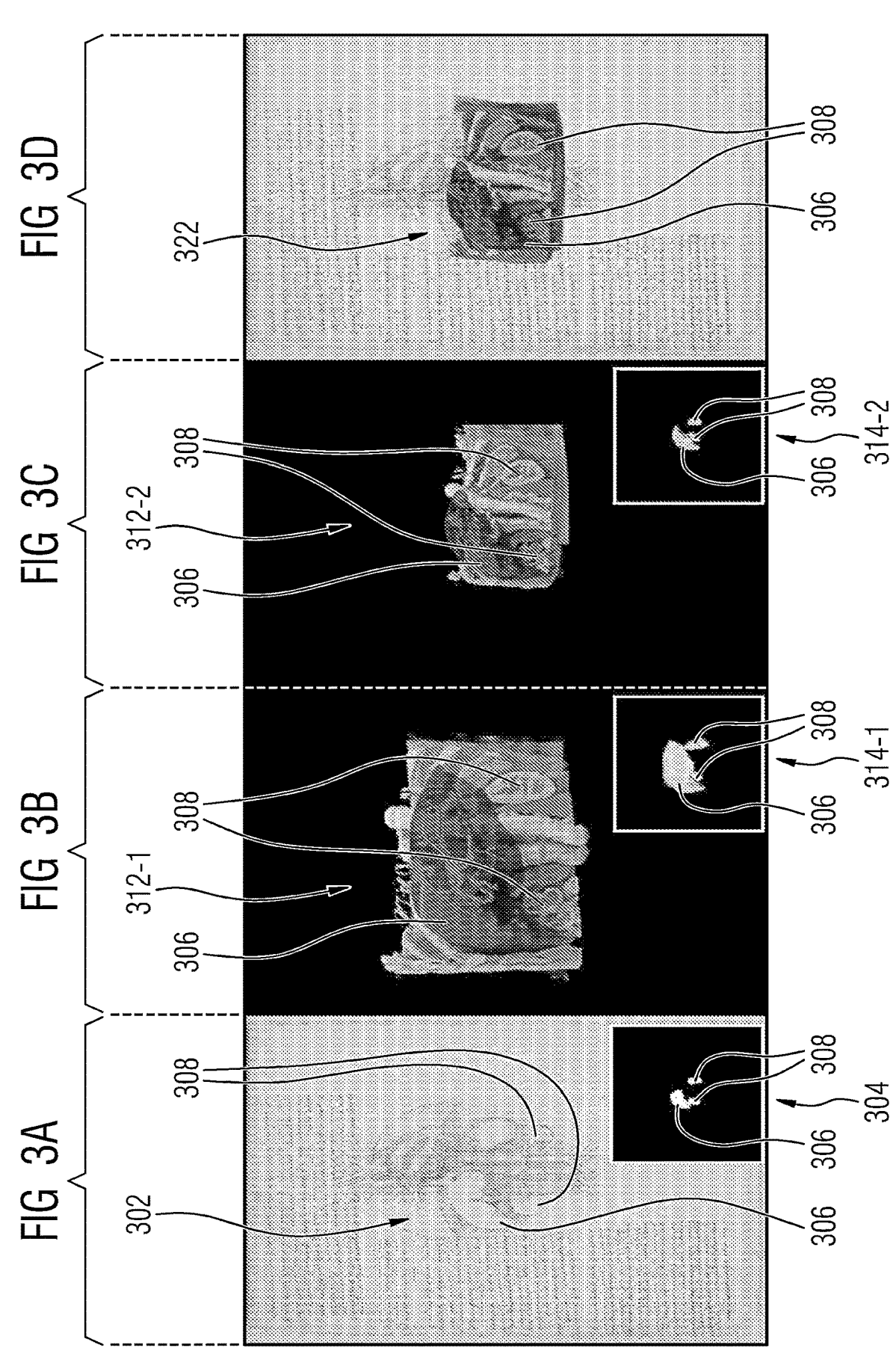

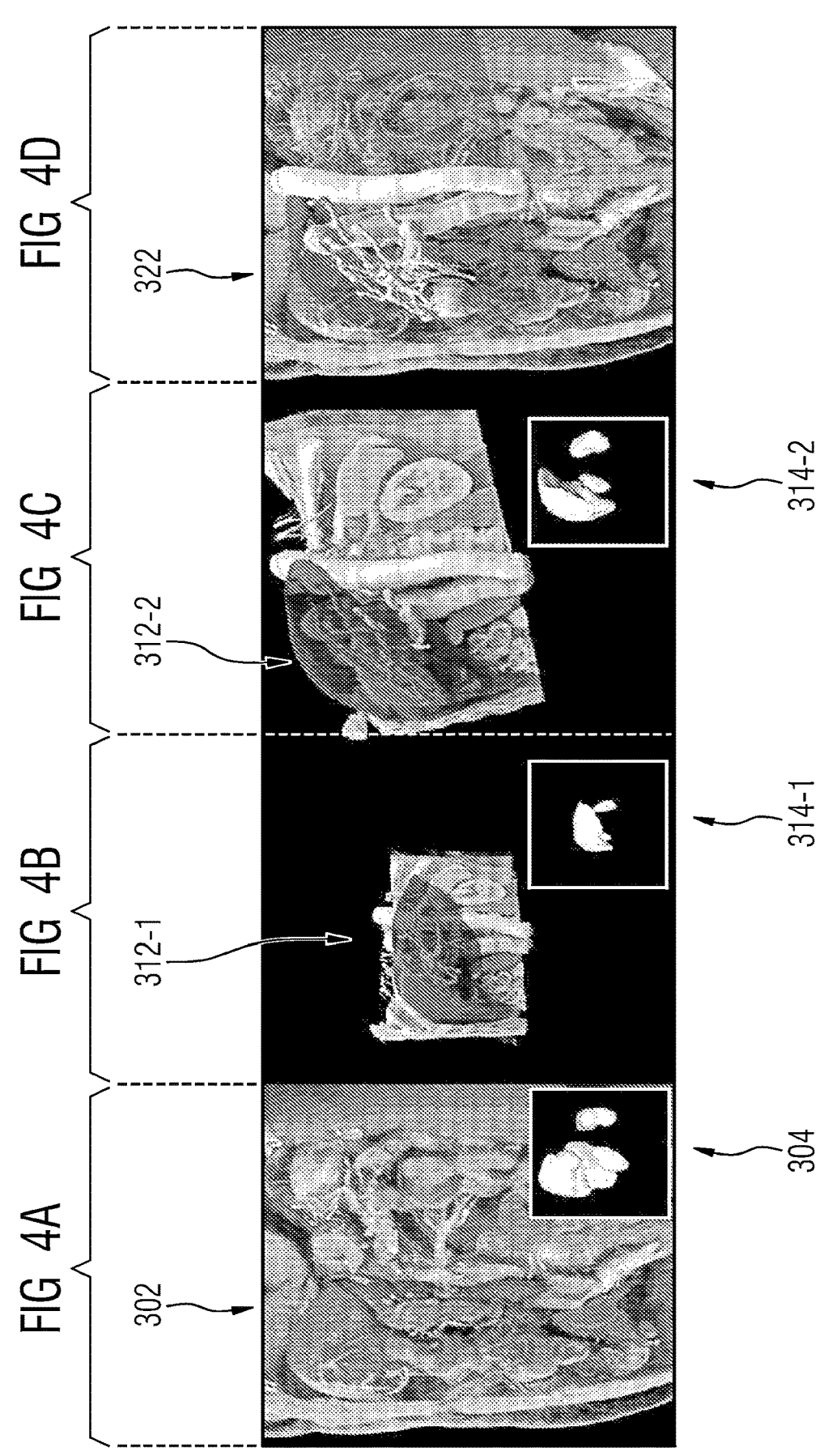

TECHNIQUE FOR OPTIMIZING RENDERING PARAMETERS OF OVERLAYS OF MEDICAL IMAGES

RELATED APPLICATION

This application claims the benefit of EP 22171999.0, filed May 6, 2022, which is hereby incorporated by reference in its entirety.

FIELD

A technique for optimizing rendering parameters of overlays of medical images over reference images is provided. In particular, a method for optimizing rendering parameters in differentiable rendering of medical images is provided.

BACKGROUND

Differentiable rendering (DR) models the explicit relationship between rendering parameters and resulting images in traditional image synthesis. In DR, image-space derivatives with respect to the rendering parameters are obtained, which derivatives can be used in a variety of gradient-based optimization methods to solve inverse rendering problems or to compute the loss for training machine learning models directly in the space of rendered images. While many conventional differentiable renderers, such as OpenDR, are limited to simple surface rendering and local shading, there are examples for photorealistic surface and participating media rendering. However, DR is conventionally not applied to heterogeneous volume data, which typically are obtained by medical scanners.

More recently, a system for Differentiable Direct Volume Rendering was introduced. The system presents a more general approach to differentiable direct volume rendering that can solve a wider range of inverse rendering problems. It comes, however, at the cost of both computational complexity and long computing time.

Conventional volume visualization methods based on ray casting, which are still used in many current advanced visualization medical products, simulate only the emission and absorption of radiant energy along the primary viewing rays through the volume data. The emitted radiant energy at each point is absorbed according to the Beer-Lambert law along the ray to the observer location with absorption coefficients derived from the patient data. Renderers conventionally compute shading using only standard local shading models at each point along the ray (e.g., the Blinn-Phong model), based on local volume gradients (i.e., local illumination). While fast, these methods do not simulate the complex light scattering and extinction associated with photorealism (i.e., global illumination).

Physically-based Monte Carlo light transport simulates light paths though the volume data with multiple scattering events per path using a stochastic process. As more and more paths are simulated, the solution converges on an accurate estimation of the irradiance at each point for incoming light from all directions. The renderer employs a hybrid of volumetric scattering and surface-like scattering, modeled by phase functions and bidirectional reflectance distribution functions (BRDFs), respectively, based on properties derived from the anatomical data.

The conventional techniques are, however, limited by both computational speed and computational memory, in particular for heterogenous volume data, rendering them unsuitable for overlays of medical images of heterogeneous volume data, in particular at real-time.

SUMMARY AND DESCRIPTION

It is therefore an object to provide an efficient solution for a photorealistic overlay of medical heterogenous volume data, including a medical image and a reference image that are heterogenous. Alternatively, or additionally, there is a need for a photorealistic technique for providing photorealistic overlays, in particular of heterogeneous medical image data, that is efficient in time and/or computational effort.

This object is solved by a computer implemented method for rendering of an overlay of an aligned medical image from data obtained from a medical scanner (which may also be denoted as medical imaging device or medical image scanner) with a reference image, by a computing device, by a system including the medical scanner and the computing device, by a computer program and/or computer program product, and by a non-transitory computer-readable medium.

Advantageous aspects, features and embodiments are described in the following description together with advantages.

In the following, the solution is described with respect to the method for rendering of an overlay of an aligned medical image from data obtained from a medical scanner with a reference image as well as with respect to the computing device and the system including the computing device. Features, advantages, and/or alternative embodiments herein can be assigned to the other claimed objects (e.g., the computer program or a computer program product), and vice versa. In other words, claims for the computing device and/or for the system can be improved with features described or claimed in the context of the method. In this case, the functional features of the method are embodied by structural units or devices of the computing device and/or of the system and vice versa, respectively.

As to a first aspect, a computer-implemented method for rendering of an overlay of an aligned medical image from data obtained from a medical scanner with a reference image is provided. The method includes an act of receiving at least one reference image. The at least one reference image includes at least one reference (e.g., anatomical) structure of a body. The method further includes an act of determining an intermediate representation of the at least one reference structure included in the received at least one reference image (also briefly denoted as intermediate representation of, or associated with, the at least one reference image). The method further includes an act of receiving at least one medical image from a medical scanner. The at least one medical image includes, at least partially, structures of a patient's body corresponding to the at least one reference structure of the received at least one reference image. The method further includes an act of determining an intermediate representation of at least part of the structures included in the received at least one medical image (also briefly denoted as intermediate representation of, or associated with, the at least one medical image). The method further includes an act of receiving at least one rendering parameter for rendering the received at least one medical image. The method further includes an act of optimizing the received at least one rendering parameter for aligning and overlaying the received at least one medical image with the received at least one reference image. The optimizing includes comparing the intermediate representation of the received at least one medical image with the intermediate representation of the received at least one reference image.

The method further includes an act of aligning and overlaying the received at least one medical image with the received at least one reference image based on the optimized at least one rendering parameter. The method still further includes an act of rendering the aligned and overlayed at least one medical image with the at least one reference image.

The at least one medical image and/or the at least one reference image may also be denoted as volume data.

The medical scanner may include a device (scanner) for magnetic resonance tomography (MRT), for computed tomography (CT), for positron emission tomography (PET), and/or for ultrasound (US).

The at least one reference image may include one or more further medical images, which may be obtained from any one of the abovementioned types of scanners as well. E.g., the at least one reference image may include one or more medical images obtained from the same body in a previous scan, either using the same (or same-type) further medical scanner or a different type of medical scanner from the medical scanner.

Alternatively, or additionally, the at least one reference image may include an artificially generated image, e.g., generated by computer graphics.

The (e.g., patient's) body may include a human body.

The body of the at least one reference image and the patient's body of the at least one medical image may be identical.

Alternatively, the body of the at least one reference image and the patient's body of the at least one medical image may differ, e.g., include two different human bodies.

The reference structure (also denoted as reference anatomical structure) may include one or more internal organs, e.g., liver and/or one or more kidneys, and/or bone structures, e.g., at least part of a ribcage, spinal column and/or hip.

The at least one medical image may include at least partially the same structures (also denoted as anatomical structures), e.g., internal organs and/or bone structures, as the reference structure.

Alternatively, or additionally, each of the intermediate representations may also be denoted as a (e.g., binary) mask, (e.g., binary) layout mask, and/or geometric approximation (briefly: geometric proxy).

The mask may include a two-dimensional representation of a three-dimensional volume. Alternatively, or additionally, the mask may include a three-dimensional representation of a three-dimensional volume.

Alternatively, or additionally, each of the intermediate representations may include a segmentation of the corresponding structures (e.g., the at least one reference structure of the at least one reference image, and/or the at least partial structures of the at least one medical image).

Further alternatively, or additionally, each of the intermediate representations may include a mesh, an isosurface, and/or a point cloud.

The received at least one rendering parameter may correspond to a previously stored rendering parameter in association to one or more structures of the at least one reference images and/or of the at least one medical image received from the medical scanner. E.g., a look-up table may include a set of (e.g., initial) rendering parameters in dependence of the type of structure, and/or in dependence on the type of medical scanner.

The at least one rendering parameter may include a camera parameter, a lighting parameter, a color (e.g., on a per pixel and/or voxel basis) and/or shading. Shading may include a computation of the illumination based on a voxel (and/or pixel) classification and/or lighting parameters.

A voxel may correspond to a three-dimensional (e.g., cubic) volume as the minimal volumetric size that can be resolved by the medical scanner. Alternatively, or additionally, a pixel may correspond to a two-dimensional representation, e.g., of a three-dimensional (e.g., cubic) volume, as the minimal two-dimensional projection size that can be resolved by the medical scanner.

The rendering and/or optimizing may include performing a gradient descent with respect to (and/or on) the at least one rendering parameter, and/or on a scene including the intermediate representation related to the at least one reference image and the intermediate representation related to the at least one medical image. Alternatively, or additionally, optimizing may include taking into account (e.g., at least first) derivatives of the at least on rendering parameter.

Optimizing the at least one rendering parameter by a gradient descent, e.g., on image space derivatives, and/or using derivatives may be denoted as differentiable rendering (DR).

Alternatively, or additionally, DR may include a computational process (also denoted as rendering process) capable of solving so-called inverse rendering problems, e.g., estimating scene and/or rendering parameters (for brevity often collectively denoted as rendering parameters) based on a reference image. Specifically, a computing device may determine partial derivatives of one or more properties, in particular one or more rendering parameters, of (e.g., discrete) image locations (e.g., an image pixel color and/or image voxel color) with respect to individual rendering and/or scene parameters. The determined derivatives may then be used as part of the optimization (e.g., gradient descent), e.g., to push rendering and/or scene parameter values toward an optimal solution to some objective function and/or loss function. E.g., the optimizing act (also denoted as the optimization process) may minimize a perceptual difference, e.g., produced by the computing device using the at least one rendering parameter, between the at least one medical image and the at least one reference image.

Optimizing the received at least one rendering parameter may include minimizing an error in the alignment of the at least one reference structure and the at least partial structures of the medical image.

The optimizing act may include one or more iterations. E.g., the at least one rendering parameter may be updated, the intermediate representations associated with the at least one medical image compared to the at least one reference image, and then a further update of the at least one rendering parameter may be performed, until the iteration converges to an optimized value of the at least one rendering parameter.

Aligning may include rotating and/or translating the at least one medical image to produce a spatial overlay of the corresponding structures. Alternatively, or additionally, aligning may include, e.g., 2D-2D and/or 2D-3D, registration algorithms, any of which may be rigid and/or deformable.

The act of aligning the at least one medical image with the at least one reference image need not be performed directly. Alternatively, or additionally, the intermediate representation of the medical image may be rendered using differentiable rendering.

The optimizing act may include optimizing one or more camera parameters (and/or scene parameters) as the at least one rendering parameter, resulting in an optimal alignment of the at least one medical image with the at least one reference image.

The optimizing act may be generally applicable to all continuous rendering parameters related to the intermediate representations beyond the camera, for which image-space derivates can be computed, e.g., lighting parameters.

The reference image used for differentiable rendering may be obtained by rendering the intermediate representation of a reference medical image, and/or by non-rendered approaches.

According to one technique, differentiable rendering may be applied on the one or more intermediate representations of the at least one medical image, as part of a parameter optimization algorithm, e.g., involving a comparison with one or more intermediate representations of the at least one reference image. The optimal parameters may then be applied to the (e.g., main and/or final) rendering act to produce a rendered image that is better suited for overlaying. Alternatively, or additionally, an enabling act includes taking the parameters optimized through DR on the intermediate geometric representations and applying them to the final volume rendering.

Overlaying may further include adapting one or more optical properties. The one or more optical properties may include an opacity (or transparency, which may be considered as the inverse of the opacity) and/or a color. The one or more optical properties may alternatively, or additionally, be indicative of a classification of the structures, a reflectance of the structures and/or one or more values indicative of a chromatic scattering of light related to the structures, e.g., scattering off of the structure's surface and/or subsurface scattering.

By one technique of rendering the aligned and overlayed at least one medical image with the at least one reference image, spatial perception for an interventional procedure (also: surgical procedure, e.g., laparoscopy) may be significantly improved, in particular when using heterogenous volume data. Alternatively, or additionally, image-based guidance during a surgical procedure may be enabled.

While not directly (e.g., without intermediary representations) applicable to heterogeneous volume rendering of medical image data, one technique makes use of surface-based differentiable rendering indirectly by first deriving geometric representations (as the intermediate representations) of the volume data (as the one or more medical images and/or the one or more reference images).

By using, according to one technique described herein, an intermediate representation of the volume data and shading, simpler and faster organ-specific geometric differentiable rendering is enabled that maps parameters back to volume rendering. Alternatively, or additionally, a differentiable volume rendering technique remains more expensive than the geometry-based differentiable rendering according to the present approach.

The technique may implement both realtime raytracing and Monte Carlo path tracing, for both volumes and embedded surfaces. At the same time, the parameter estimation from surface differentiable rendering may be applicable generally to any volume rendering algorithm.

The medical scanner may include a device, selected from the group, of a surgical camera, an ultrasound (US) device, a positron emission tomography (PET) device, an x-ray imaging device (e.g., for X-ray fluoroscopy during an interventional procedure), a computed tomography (CT) device, and/or a magnetic resonance tomography (MRT) device.

The surgical camera may include a life-feed camera, e.g., an endoscopic camera. Alternatively, or additionally, the surgical camera may provide a series of real-time medical images during a surgical procedure.

Any one of the US, PET, CT, and/or MRT devices (scanners) may provide a series of real-time medical images.

Alternatively, or additionally, any one of the US, PET, CT, and/or MRT devices may provide a series of pre-recorded images.

The act of rendering may include rendering the aligned and overlayed at least one medical image with the at least one reference image using a device, selected from the group of a screen, a stereoscopic display, a virtual reality (VR) display, and/or an augmented reality (AR) headset.

The screen may be located in a room, e.g., where the medical scanner is located. E.g., the screen may include, or may be part of, an image-based guidance procedures (e.g., surgical procedures with image guidance).

The stereoscopic display may provide a three-dimensional impression of structures.

The at least one reference image may be selected from the group of a cryosection image data set, a synthetically generated image, and/or an image received from a medical scanner, in particular including one of the devices mentioned above (e.g., a surgical camera, US device, PET device, x-ray imaging device, CT device, and/or MRT device).

The intermediate representation of the at least one reference structure, and/or the intermediate representation of the at least partial structures of the at least one medical image may be selected from the group of a segmentation, a mesh, an isosurface, and/or a point cloud.

Any one of the intermediate representations may include one or more geometric proxies.

The one or more geometric proxies may include a (e.g., triangle and/or polygon, also denoted as polygonal) mesh, by which, e.g., (in particular three-dimensional, 3D) structures within a predetermined set of (in particular 3D) structures of, the at least one reference image and/or the at least one medical image is approximated. The mesh may include a two-dimensional and/or a three-dimensional representation.

Alternatively, or additionally, polygonal meshes with vertices may be defined in 3D space, with those in computer graphics conventionally referred as 3D meshes. Tetrahedral meshes may be defined as higher order meshes that can represent both surfaces and volume data. Tetrahedral meshes may potentially be a useful geometric representation for differentiable rendering, but the rendering complexity currently negates any potential advantages compared to differentiable direct volume rendering.

Alternatively, or additionally, the one or more geometric proxies may include (e.g., a set of) isosurfaces. Isosurfaces may denote surfaces, along which a predetermined parameter, e.g., an image intensity, is constant. Alternatively, or additionally, an isosurface may be determined and/or defined by an isovalue, e.g., a constant value of a predetermined parameter.

An isosurface may be determined using a level set method, and/or based on a segmentation of a structure, e.g., an organ, included in the at least one reference image and/or in the at least one medical image. Alternatively, or additionally, in some examples, an isosurface may correspond to a surface of an (in particular internal) organ (also denoted as organ contouring and/or organic contouring). An isosurface in this context may be defined as the surfaces along which the image intensities have a certain isovalue.

Further alternatively, or additionally, the one or more geometric proxies may include a point cloud. Each point in the point cloud may be assigned a predetermined parameter.

Alternatively, or additionally, a point cloud may include locations along viewing rays that correspond to visible surface-like structures in the volume data, e.g., the surfaces of organs. Alternatively, or additionally, point clouds may be generated by sampling of segmentation surfaces, e.g., using Poisson-disk sampling.

The color of a point within a point cloud may be determined as part of a shading process, e.g., using a volume classification color and/or a diffuse shading color. The color may encode some property of the scene, e.g., a unique color for each body organ type.

The intermediate representation associated with the reference image and the intermediate representation associated with the medical image may be of the same type, or of different types.

The at least one rendering parameter may be selected from the group of a view position, a field of view, a view orientation, a depth of field, and/or a lighting.

The view position may also be denoted as camera position. The field of view may also be denoted as the camera field of view. The view orientation may also be denoted as the camera orientation.

The field of view may include an angle of view.

The depth of field may include a distance between a nearest and a farthest point that are in acceptably sharp focus in an image, e.g., in the at least one medical image.

The volume classification may include a classification in terms of a type of structure, e.g., soft tissue (e.g., for internal organs and/or skin) versus bone tissue.

The received at least one reference image and/or the received at least one medical image may include a series of non-static images.

The one or more series of non-static medical images may be received from the medical scanner in real-time during an interventional procedure.

Comparing the intermediate representation of the received at least one medical image with the intermediate representation of the received at least one reference image may include generating a function of a difference of at least one property of the intermediate representation of the received at least one medical image and of the intermediate representation of the received at least one reference image. The act of optimizing the at least one rendering parameter may include determining at least one partial derivative of the generated function with respect to the at least one rendering parameter.

The at least one property of the intermediate representation of the received at least one medical image and of the intermediate representation of the received at least one reference image may include an image color per discrete image location.

A discrete image location may include a pixel and/or a voxel of an image, in particular of the at least one reference image and/or the at least one medical image.

Optimizing the at least one rendering parameter may include minimizing the generated function of the difference of the at least one property of the intermediate representation of the received at least one medical image and of the intermediate representation of the received at least one reference image.

The generated function may include, or may be denoted as, an objective function, a loss function, a cost function and/or an error function. Alternatively, or additionally, the generated function may include a perceptual difference of the at least one medical image and the at least one reference image.

Determining the at least one partial derivative may be denoted as performing differentiable rendering (e.g., with respect to at least one parameter).

Any one of the intermediate representations may be denoted as geometric proxy, e.g., using a differentiable mesh rasterization on segmentation surfaces.

The intermediate representation may be rendered as well. This feature has the technical advantage to further infer and/or make visible intermediate results in volume rendering.

Alternatively, or additionally, the intermediate representations are rendered and/or used as part of the differentiable rendering in the optimizing act (also denoted as optimization process). In a preferred embodiment, the meshes are not rendered as part of the final rendering. E.g., if the liver and kidney surfaces are used for DR, the resulting camera parameters may be used for volumetric rendering of the liver and kidneys.

Further alternatively, or additionally, clinically relevant segmentation surfaces embedded in the volume data (briefly: clinically relevant objects) may be rendered as part of the final image. Those clinically relevant objects may be distinct from the intermediate representation, even when using the same geometric surface. E.g., the surfaces in the final rendering be subdivided and/or optimized and/or filtered, and/or may use different material and/or shading properties.

The act of rendering may be implemented by a volume rendering algorithm and may use raycasting or Monte Carlo path tracing. However, the specific type of algorithm used, is irrelevant for the concept of the present solution, presented herein. The differentiable rendering is "only" performed on the geometric proxies of the volume data, e.g., using differentiable mesh rasterization on the segmentation surfaces. The parameters computed—e.g., from gradient descent—are then used for the volume rendering, but the optimization process does not use any volume rendering itself.

The method may further include an act of generating a light path by ray casting and/or Monte Carlo path tracing from the spherical light source. The act of generating a light path by ray casting and/or Monte Carlo path tracing from the spherical light source may be performed during and/or after the acts of aligning and overlaying the at least one medical image with the received at least one reference image based on the optimized at least one rendering parameter.

Conventional volume visualization methods based on ray casting, which are still used in many current advanced visualization medical products, simulate only the emission and absorption of radiant energy along the primary viewing rays through the volume data. The emitted radiant energy at each point is absorbed, e.g., according to the Beer-Lambert law, along the ray to the observer location with absorption coefficients derived from the patient data. Computing devices (also denoted as renderers) typically compute shading using only the standard local shading models at each point along the ray (e.g., the Blinn-Phong model), based on the local volume gradients (also denoted as local illumination). While fast, the conventional methods do not simulate the complex light scattering and extinction associated with photorealism (also denoted as global illumination). For ray casting, e.g., absorption coefficients may be derived from patient data.

(E.g., physically-based) Monte Carlo path tracing and/or ray tracing (also briefly path tracing and/or ray tracing) may be used to simulate a light path though volume data with multiple scattering events per path using a stochastic process. As more and more paths and/or rays are simulated, the solution converges on an accurate estimation of the irradiance at each point for incoming light from all directions. A computing device (also denoted as renderer) may employ a hybrid of volumetric scattering and surface-like scattering, modeled by phase functions and bidirectional reflectance distribution functions (BRDFs), respectively, based on properties derived from anatomical data, in particular the anatomical structures of the volume data.

At least the acts of receiving the at least one reference image, determining an associated intermediate representation, receiving the at least one medical image, determining an associated intermediate representation, and receiving and optimizing the at least one rendering parameter may be performed by a graphics processing unit (GPU).

As to a second aspect, a computing device (computer) for rendering of an overlay of an aligned medical image from data obtained from a medical scanner with a reference image is provided.

The computing device includes a first interface configured for receiving at least one reference image. The at least one reference image includes at least one reference structure of a body. The computing device further includes a first processing unit (processor) configured for determining an intermediate representation of the at least one reference structure included in the received at least one reference image.

The computing device further includes a second interface configured for receiving at least one medical image from a medical scanner. The at least one medical image includes at least partially structures of a patient's body corresponding to the at least one reference structure of the received at least one reference image. The computing device further includes a second processing unit (processor) configured for determining an intermediate representation of at least part of the structures included in the received at least one medical image.

The computing device further includes a third interface configured for receiving at least one rendering parameter for rendering the received at least one medical image.

The computing device further includes a third processing unit (processor) configured for optimizing the received at least one rendering parameter for aligning and overlaying the received at least one medical image with the received at least one reference image. The optimizing includes comparing the intermediate representation of the received at least one medical image with the intermediate representation of the received at least one reference image.

The computing device further includes a fourth processing unit (processor) configured for aligning and overlaying the received at least one medical image with the received at least one reference image based on the optimized at least one rendering parameter.

The computing device still further includes a fourth interface configured for outputting the aligned and overlayed at least one medical image with the at least one reference image for rendering.

Alternatively, or additionally, the computing device according to the second aspect may be configured to perform any one of the method acts, and/or may include any one of the features, disclosed within the context of the first aspect.

As to a third aspect, a system for rendering of an overlay of an aligned medical image from data obtained from a medical scanner with a reference image is provided. The system includes a reference database for providing at least one reference image. The system further includes a medical scanner for providing at least one medical image. The system further includes a computing device according to the second aspect. The first interface of the computing device is configured to receive the at least one reference image from the reference database. The second interface of the computing device is configured to receive the at least one medical image from the medical scanner. The system still further includes a rendering unit (renderer or GPU) including an interface for receiving the output from (e.g., the fourth interface of) the computing device. The rendering unit is configured to render the aligned and overlayed at least one medical image with the at least one reference image.

The rendering unit may include a screen (e.g., in an operating room), a stereoscopic display, a VR display and/or an AR headset.

As to a fourth aspect, a computer program product including program elements which induce a server, e.g., embodied by the computing device of the second aspect, to carry out the acts of the method for rendering of an overlay of an aligned medical image from data obtained from a medical scanner with a reference image according to first aspect, when the program elements are loaded into a memory of the server.

As to a fifth aspect, a non-transitory computer-readable medium on which program elements are stored that can be read and executed by a server, e.g., embodied by the computing device of the second aspect, in order to perform acts of the method for rendering of an overlay of an aligned medical image from data obtained from a medical scanner with a reference image according to the first aspect, when the program elements are executed by the server.

The properties, features, and advantages described above, as well as the manner they are achieved, become clearer and more understandable in the light of the following description and embodiments, which will be described in more detail in the context of the drawings. This following description does not limit the invention on the contained embodiments. Same components or parts can be labelled with the same reference signs in different figures. In general, the figures are not for scale.

It shall be understood that a preferred embodiment of the present invention can also be any combination of the dependent claims, or above embodiments with the respective independent claim.

These and other aspects will be apparent from and elucidated with reference to the embodiments described hereinafter.

Any reference signs in the claims should not be construed as limiting the scope.

BRIEF DESCRIPTION OF THE DRAWINGS

FIGS. 3A, 3B, 3C and 3D show a first exemplary embodiment, in which an anatomical drawing as reference image and a CT scan as medical image are aligned and overlayed by using respective intermediary representations for rendering parameter optimization;

FIGS. 4A, 4B, 4C and 4D show a second exemplary embodiment, in which a full body CT scan as reference scan and a further CT scan as the medical image, which includes a pathology, are aligned and overlayed using respective intermediary representations for rendering parameter optimization.

DETAILED DESCRIPTION

Figures 1, 2:
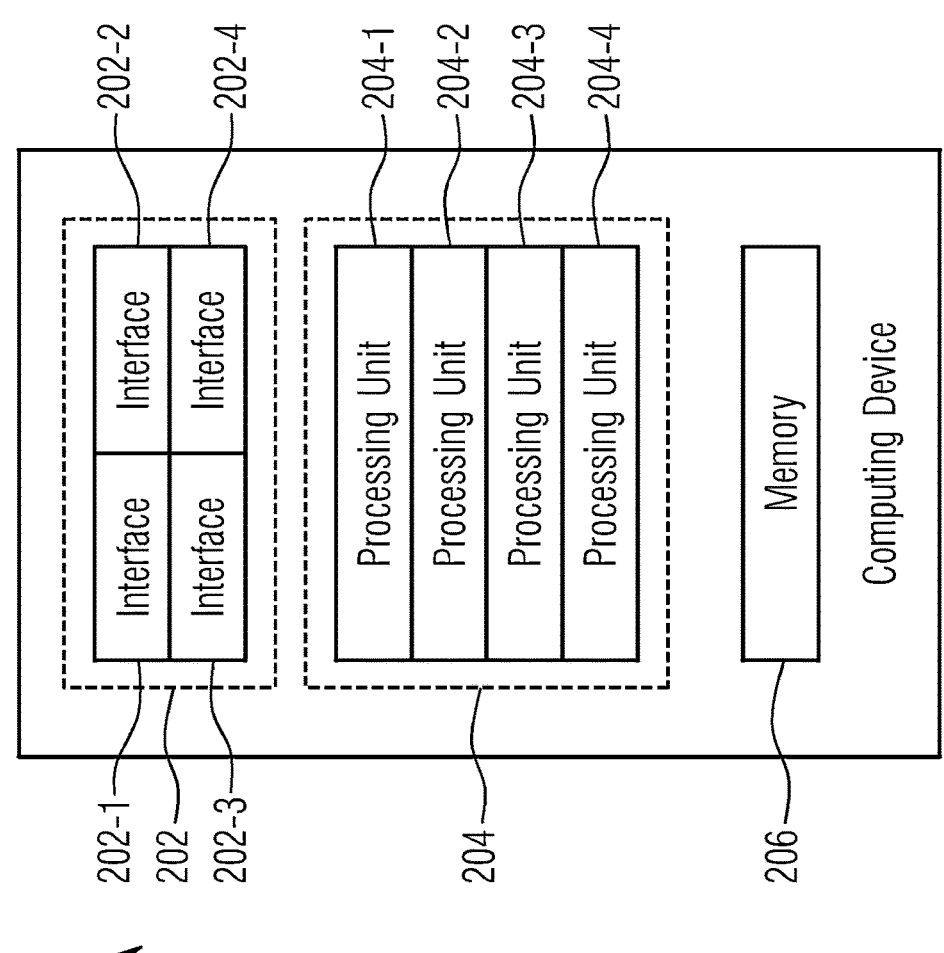
FIG. 1 is a flow chart of a method according to a preferred embodiment.
FIG. 2 is an overview of the structure and architecture of a computing device according to a preferred embodiment.

FIG. 1 shows an exemplary flowchart of a computer-implemented method 100 for rendering of an overlay of an aligned medical image from data obtained from a medical scanner with a reference image.

The method 100 includes an act S102 of receiving at least one reference (e.g., anatomic) image. The at least one reference image includes at least one reference structure of a body.

The method 100 further includes an act S104 of determining an intermediate representation of the at least one reference structure included in the received S102 at least one reference image.

The method 100 further includes an act S106 of receiving at least one medical image from a medical scanner. The at least one medical image includes at least partially structures of a patient's body corresponding to the at least one reference structure of the received S102 at least one reference image.

The method 100 further includes an act S108 of determining an intermediate representation of at least part of the structures included in the received S106 at least one medical image.

The method 100 further includes an act S110 of receiving at least one rendering parameter for rendering the received S106 at least one medical image.

The method 100 further includes an act S112 of optimizing the received S110 at least one rendering parameter for aligning and overlaying the received S104 at least one medical image with the received S102 at least one reference image. The optimizing S112 includes comparing the intermediate representation of the received S106 at least one medical image with the intermediate representation of the received S102 at least one reference image.

The method 100 further includes an act S114 of aligning and an act S116 of overlaying the received S106 at least one medical image with the received S102 at least one reference image based on the optimized S112 at least one rendering parameter.

The method 100 still further includes an act of rendering S118 the aligned S114 and overlayed S116 at least one medical image with the at least one reference image.

FIG. 2 shows an exemplary computing device 200 for rendering of an overlay of an aligned medical image from data obtained from a medical scanner with a reference image.

The computing device 200 includes a first interface 202-1 configured for receiving at least one reference image. The at least one reference (e.g., anatomical) image includes at least one reference structure of a body.

The computing device 200 further includes a first processing unit 204-1 configured for determining an intermediate representation of the at least one reference structure included in the received at least one reference image.

The computing device 200 further includes a second interface 202-2 configured for receiving at least one medical image from a medical scanner. The at least one medical image includes at least partially structures of a patient's body corresponding to the at least one reference structure of the received at least one reference image.

The computing device 200 further includes a second processing unit 204-2 configured for determining an inter-mediate representation of at least part of the structures included in the received at least one medical image.

The computing device 200 further includes a third interface 202-3 configured for receiving at least one rendering parameter for rendering the received at least one medical image.

The computing device 200 further includes a third processing unit 204-3 configured for optimizing the received at least one rendering parameter for aligning and overlaying the received at least one medical image with the received at least one reference image. The optimizing includes comparing the intermediate representation of the received at least one medical image with the intermediate representation of the received at least one reference image.

The computing device 200 further includes a fourth processing unit 204-4 configured for aligning and overlaying the received at least one medical image with the received at least one reference image based on the optimized at least one rendering parameter.

The computing device 200 still further includes a fourth interface 202-4 configured for outputting the aligned and overlayed at least one medical image with the at least one reference image for rendering.

The fourth interface 202-4 may be connected to an interface of a rendering unit (e.g., a screen in a room, and/or an AR headset).

Optionally, the computing device 200 includes a memory 206, e.g., for storing the received at least one reference image, the received at least one medical image, and/or the received at least one rendering parameter. Alternatively, or additionally, the memory 206 may be used for storing the determined intermediate representation of the at least one reference structure and/or of the at least part of the structures included in the at least one medical image, for storing the optimized at least one rendering parameter, and/or for storing the aligned and overlayed at least one medical image with the at least one reference image.

The first interface 202-1, the second interface 202-2, the third interface 202-3 and the fourth interface 202-4 may be embodied by a combined interface 202 configured to perform the corresponding acts. Alternatively, or additionally, any two or more of the interfaces 202-1; 202-2; 202-3; 202-4 may be combined into one interface configured to perform the corresponding acts.

The first, second, third and fourth processing unit 204-1; 204-2; 204-3, 204-4 may be embodied by a combined processing unit 204, e.g., by a CPU and/or a GPU, configured to perform the corresponding acts. Alternatively, or additionally, any two or more of the processing units 204-1; 204-2; 204-3; 204-4 may be combined into one processing unit configured to perform the corresponding acts.

The one or more processing units 204; 204-1; 204-2; 204-3; 204-4 may be a combination of one or more of a microprocessor, controller, microcontroller, central processing unit (CPU), digital signal processor, application specific integrated circuit, field programmable gate array, graphics processing unit (GPU), or any other suitable computing device, resource, or combination of hardware, microcode and/or encoded logic operable to provide, either alone or in conjunction with other components of the device 200, such as the interfaces 202; 202-1; 202-2; 202-3; 202-4 and the optional memory 206, graphics processing and/or parameter optimizing functionality. For example, the one or more processors 204; 204-1; 204-2; 204-3; 204-4 may execute instructions stored in the memory 206. Such functionality may include providing various features and acts discussed herein, including any of the benefits disclosed herein. The expression "the device being operative to perform an action" may denote the device 200 being configured to perform the action.

As schematically illustrated in FIG. 2, the device 200 may be embodied by a computer, in particular a workstation, including a GPU.

The first interface 202-1, the first processing unit 204-1, the second interface 202-2; the second processing unit 204-2, the third interface 202-3, the third and fourth processing units 204-3; 204-4, and the fourth interface 202-4 may be configured to perform the method acts S102 to S118, respectively.

The method 100, e.g., when performed by the computing device 200, enables automated rendering parameter optimization toward an example-based reference image (also denoted as target or preset) using indirect differentiable rendering (DR). In particular, the challenging problem of explicitly modelling the relationship between rendering parameters and the resulting images in the context of photorealistic physically-based volume rendering, such as the Monte Carlo volume path tracing, is addressed, where a large space of parameters makes some traditional differentiable rendering (DR) techniques impractical, in particular for heterogeneous volume data.

According to one technique, firstly intermediate representations (also denoted as geometric approximations, or shortly: geometric proxies) are derived to the volume data, which may include one or more reference images and/or one or more medical images obtained from a medical scanner. According to the inventive technique, the volume rendering process with the optimization of the remaining parameters may be handled indirectly, e.g., by a mesh-based computing device (also denoted as mesh-based differentiable renderer).

The technique is suitable for a variety of applications related to rendering presets (also denoted as reference images) for volume rendering, including (but not limited to) automated data-specific optimization of rendering parameters using example-based presets; matching of view and lighting for augmented reality surgical guidance; and rendering optimization for teaching workflows with preset adaptation to real patient data.

While not directly (e.g., without intermediate representations) applicable to heterogeneous volume rendering of medical data, the technique uses surface-based differentiable rendering indirectly by first deriving geometric representations (also denoted as intermediate representations) of the volume data (e.g., included in the at least one reference image and/or the at least one medical image).

The technique may implement any one or both of realtime raytracing and Monte Carlo path tracing, for both volumes and embedded surfaces. At the same time, the rendering parameter optimization (also denoted as estimation) from surface differentiable rendering may be applicable generally to any volume rendering algorithm.

The final volume rendering algorithm, e.g., when and/or before the act S118 of rendering the aligned S114 and overlayed S116 at least one medical image with the at least one reference image, may use ray casting and/or Monte Carlo path tracing. Alternatively, or additionally, the act S112 of optimizing the at least one rendering parameter may be independent of, and/or separate from, the ray casting and/or Monte Carlo path tracing.

Differentiable rendering may (e.g., only) be performed on the geometric proxies (or intermediate representations) of the volume data (e.g., associated with the at least one medical image and/or the at least one reference image), e.g., using differentiable mesh rasterization on segmentation surfaces. The rendering parameters optimized (e.g., computed), e.g., from gradient descent may then be used for the volume rendering. Alternatively, or additionally, the optimization process (as the act 112) need not use any volume rendering itself.

By the technique, differentiable volume rendering may be, at least partially, avoided. In particular, photorealistic techniques (e.g., fully-differentiable, physically-based Monte Carlo rendering) currently are not practical in medical applications for real-time rendering due to their computational time and effort.

In the following, an exemplary implementation of the technique is described, which includes the following acts: Given a reference image (also denoted as target 2D image), an intermediate representation (e.g., one or more 2D masks) of (e.g., selected) structures is obtained. For images rendered from 3D data, automatically segmented structures may be used for the intermediate representation. Alternatively, or additionally, geometric proxies such as isosurfaces and/or point clouds derived from the at least one reference image and/or the at least one medical image (also denoted as volume rendering) may be used as intermediate representation.

Given a new medical image (also denoted as volume dataset), rendering parameters that closely reproduce the reference image (or the target image) are determined by one or more of the following method acts. A surface segmentation of selected structures, e.g., of the medical image and/or of the reference image, may be obtained.

Alternatively, or additionally, a gradient-based optimization using DR of the (e.g., selected) structures may be applied based on the reference image (or the target image).

A final image using the medical image (or the volume dataset), the reference image, and the determined (e.g., computed) rendering parameters may be rendered.

FIGS. 3A, 3B and 3C show a first exemplary embodiment of the technique. The reference image (or the target image) 302 in FIG. 3A includes an anatomical drawing (by Leonardo da Vinci, RCIN 919112), which includes as reference structures the liver 306 and kidneys 308 of a human body.

FIG. 3A shows at reference sign 304 a two-dimensional segmentation and/or (e.g., target) layout mask of the reference structures 306; 308 as the corresponding intermediate representation.

FIG. 3B shows a CT scan image (also denoted as patient data) of a human patient's abdomen, including liver 306 and kidneys 308 as structures, as an example of a medical image 312-1. The rendering (also denoted as volume rendering) of the CT scan image 312-1 in FIG. 3B is performed with an initial value of one or more rendering parameters.

At reference sign 314-1, a binary mask and/or 3D mesh representation of the segmented liver 306 and kidneys 308, as the intermediate representation of structures of the medical image, obtained by automatic artificial intelligence (AI)-based organ contouring of the CT scan image 312-1 is shown.

FIG. 3C shows the CT scan image of FIG. 3B as the medical image 312-2 after the value of the one or more rendering parameters, in particular including one or more camera rendering parameters, has been optimized. The optimization is performed by DR of the intermediate representation 314-1 of the medical image 312-1 and the intermediate representation 304 of the reference image 302. By the aligned (e.g., rotated) intermediate representation 314-2 of the medical image, an error with respect to the intermediate representation 304 of the reference image 302 is minimized. Alternatively, or additionally, by DR of the mesh data (in particular including meshes of the liver 306 and kidneys 308) of the intermediate representation 314-1; 314-2 and the intermediate representation 304, one or more camera rendering parameters are obtained that minimize the error between the surface rendering, e.g., of the intermediate representations 314-1; 314-2 of the medical image 312-1; 312-2, and the original painted mask, e.g., of the intermediate representation 304 of the reference image 306.

FIG. 3D shows the optimized one or more rendering parameters applied to create an aligned and overlayed medical image (also denoted as the, in particular 3D, patient data) 312-2 with the reference image 302 (e.g., the anatomical drawing of FIG. 3A).

The rendering of the aligned and overlayed medical image with the reference image using the one or more optimized rendering parameters may also be denoted as photorealistic volume rendering.

DR may, e.g., be applied to optimize camera parameters, lighting parameters, and/or base material properties from the reference image for the final aligned and overlayed image 322 in FIG. 3D.

FIGS. 4A, 4B, 4C and 4D show a second exemplary embodiment, in which the reference image 302 is defined from a clinical preset on a first, e.g., full body CT scan, and the medical image 312-1 includes a pathology from a second CT scan with a different field of view as shown in FIG. 4B. The organ meshes, as the intermediate representation 304 of the reference image 302 and the intermediate representation 314-1 of the (in particular pathological) medical image 312-1, in both cases are extracted by automated AI-based auto-contouring of the respective original CT data.

FIG. 4A shows the reference image 302 (also denoted as full-body atlas rendered from volume data, and/or reference patient data) including liver and kidney meshes in the corresponding intermediary representation 304, which is generated based an automatic AI-based segmentation.

FIG. 4B shows the medical image 312-1 (also denoted as new patient data) as originally and/or initially rendered, along with the corresponding intermediary representation 314-1.

FIG. 4C shows the medical image 312-2 after rendering parameters have been optimized along with the corresponding intermediary representation 314-2. The intermediary representation 314-2 includes liver and kidney meshes with rendering parameters, in particular viewing parameters, changed for optimization, e.g., including (in particular visually) aligning. The alignment of the medical image 312-2 (also denoted as the pathology, and/or as new patient data) in FIG. 4C is performed relative to the reference image 302 (also denoted as the full-body reference image) by the intermediary representation 304 of FIG. 4A.

FIG. 4D shows the final aligned and overlayed medical image (denoted as new patient data, and/or pathology) 312-2 with the reference image 302. The final image 322 makes use of the optimized rendering parameters obtained from comparing the intermediate representation 304 of the reference image 302 with the intermediate representation 314-1; 314-2 of the medical image 312-1; 312-2.

In some embodiments of the technique, both the reference image 302 and the medical images 312-1; 312-2 (also denoted as pathology images) may be rendered using data from the same patient to provide an anatomical context for medical images 312-1; 312-2 with a smaller field of view. The reference image 302 and the medical images 312-1; 312-2 may be heterogeneous in terms of using different scanners and/or different fields of view.

Alternatively, or additionally, the data may include longitudinal data scans rendered against the same reference view.

Herein, longitudinal scans may refer to scans of the same patient over time, typically done for monitoring disease progression and/or as treatment follow-up. A common challenge is to perform clinically relevant comparative visualization. In the context of this approach, a rendering of a first dataset as a reference image may be used, and parameter optimization with differentiable rendering on data from other scans may be used.

In the context of disease visualization, the intermediate representation may include segmentations of lesions together with organ segmentations, e.g., to align the lesions as closely as possible.

For educational purposes, the reference image may alternatively include a high quality full-body, e.g., CT, scan of a different patient, or even a cryosection dataset such as the Visible Human. The data may thus be heterogenous with respect of their origin from different bodies.

In a further embodiment, the computing device 200 (also denoted as the differentiable renderer) determines (e.g., estimates) both the viewing and the lighting parameters, as examples of rendering parameters, from a laparoscopic camera video feed. The reference image may contain organ surfaces detected from the camera feed as intermediary representations. The meshes, as intermediary representations of the one or more medical images, for the differentiable rendering may be obtained from auto-contouring of pre-operative (or briefly: pre-op) CT data of the patient. High quality images rendered with physically-based volume rendering may then be displayed in an Augmented Reality setting for surgical guidance.

In a still further embodiment, the differentiable rendering may use geometric proxies to the volume data that closely resemble the result of the volume rendering, rather than organ segmentation meshes, as intermediary representations. Examples of geometric proxies include (e.g., overlapping) iso-surfaces and point clouds, which can be produced as part of intermediary acts (e.g., of the volume rendering). In both cases, the proxy geometries may contain a combination of a voxel classification color and shading (e.g., baked ambient occlusion, illumination, and/or translucency as displayed in FIGS. 5A, 5B and 5C), with the differentiable rendering estimating a subset of the remaining rendering parameters.

Figure 5C:
FIGS. 5A, 5B and 5C show a comparison of rendering a human skull by direct volumetric path tracing in FIG. 5A, using isosurfaces in FIG. 5B and a point cloud in FIG. 5C.
Figure 5B:
Figure 5A:
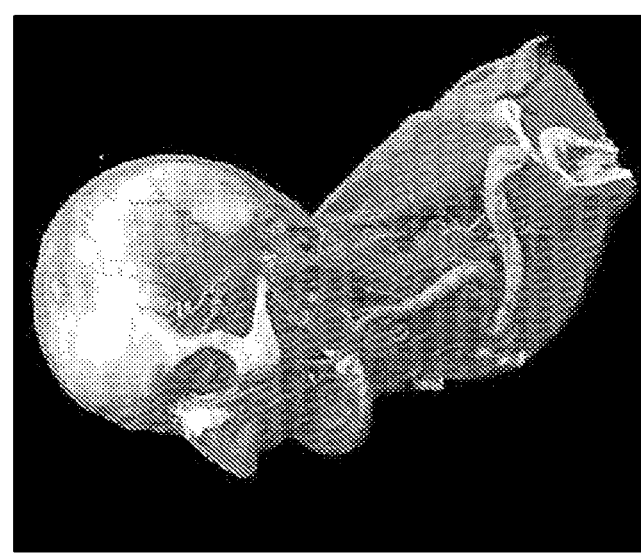

FIG. 5A shows an example of direct volumetric path tracing of 3D volume data of a human skull. FIG. 5B shows a rendering example using isosurfaces from the volume with classification color and shading baked into the vertex colors of the mesh as intermediary representation. FIG. 5C shows a rendering example using a point cloud proxy with classification color and shading baked into the point colors.

Gradients for rendering parameters involved in the generation of proxy geometries (as intermediate representations) from the method (also denoted as volume rendering process) may be determined (e.g., computed) separately and/or explicitly to optimize rendering parameters not involved in the surface-based differentiable rendering. Examples include volumetric properties of the rendering, such as windowing adjustments to the voxel classification.

An embodiment of the technique may estimate rendering parameters for photorealistic volume rendering using physically-based geometric differentiable rendering, which still uses the geometric proxies (as intermediary representations) described so far, but determines (e.g., computes) derivatives for rendering parameters related to photorealistic rendering effects. Such rendering parameters may then be mapped back to the surface-like and volumetric parts of a volumetric path tracer which employs hybrid scattering.

In a further embodiment, the technique may use volumetric physically-based differentiable rendering, which is able to automatically obtain derivatives with respect to all rendering parameters involved in the volume rendering. Such a computing device (also denoted as renderer) may preclude the need for proxy or representative geometries (as intermediary representations) in the described technique. E.g., the intermediary representations may at least approximate the full reference images, and/or the full medical images.

Wherever not already described explicitly, individual embodiments, or their individual aspects and features, described in relation to the drawings can be combined or exchanged with one another without limiting or widening the scope of the described invention, whenever such a combination or exchange is meaningful and in the sense of this invention. Advantages which are described with respect to a particular embodiment of the present invention or with respect to a particular figure are, wherever applicable, also advantages of other embodiments of the present invention.

The invention claimed is:

1. A computer-implemented method for rendering of an overlay of an aligned medical image from data obtained from a medical scanner with a reference image, the method comprising:

receiving the reference image, wherein the reference image comprises at least one reference structure of a body;

determining an intermediate representation of the at least one reference structure in the received reference image;

receiving at least one medical image from a medical scanner, wherein the at least one medical image comprises at least partially structures of a patient's body corresponding to the at least one reference structure of the received reference image;

determining an intermediate representation of at least part of the structures in the received at least one medical image;

receiving at least one rendering parameter for rendering the received at least one medical image;

optimizing the received at least one rendering parameter for aligning and overlaying the received at least one medical image with the received reference image, wherein the optimizing comprises comparing the intermediate representation of the received at least one medical image with the intermediate representation of the received reference image;

aligning and overlaying the received at least one medical image with the received reference image based on the optimized at least one rendering parameter; and rendering the aligned and overlayed at least one medical image with the at least one reference image.

2. The method of claim 1, wherein the medical scanner comprises:

a surgical camera;
   an ultrasound scanner;
   a positron emission tomography scanner;
   an x-ray imaging scanner;
   a computed tomography scanner; or
   a magnetic resonance tomography scanner.

3. The method of claim 1, wherein the act of rendering comprises rendering the aligned and overlayed at least one medical image with the reference image using a device, the device comprising:

a screen;

a stereoscopic display;
   a virtual reality display; or
   an augmented reality headset.

4. The method of claim 1, wherein the reference image comprises:

a cryosection image data set;
   a synthetically generated image; or
   an image received from a medical scanner.

5. The method of claim 1, wherein the intermediate representation of the at least one reference structure and/or the intermediate representation of the at least partial structures of the at least one medical image is:

a segmentation;
   a mesh;
   an isosurface; or
   a point cloud.

6. The method of claim 1, wherein the at least one rendering parameter comprises:

a view position;
   a field of view;
   a view orientation;
   a depth of field; and/or
   a lighting.

7. The method of claim 1, wherein at least one of the received reference image and the received at least one medical image comprises a series of non-static images.

8. The method of claim 7, wherein the series of non-static medical images is received from the medical scanner in real-time during an interventional procedure.

9. The method of claim 1, wherein comparing the intermediate representation of the received at least one medical image with the intermediate representation the received reference image comprises generating a function of a difference of at least one property of the intermediate representation of the received at least one medical image and of the intermediate representation of the received reference image, and wherein optimizing the at least one rendering parameter comprises determining at least one partial derivative of the generated function with respect to the at least one rendering parameter.

10. The method of claim 9, wherein the at least one property of the intermediate representation of the received at least one medical image and of the intermediate representation of the received reference image comprises an image color per discrete image location.

11. The method of claim 10, wherein the discrete image locations comprise pixels and/or voxels.

12. The method of claim 9, wherein optimizing the at least one rendering parameter comprises minimizing the generated function of the difference of the at least one property of the intermediate representation of the received at least one medical image and of the intermediate representation of the received reference image.

13. The method of claim 1, wherein receiving the reference image, determining the associated intermediate representation, receiving the at least one medical image, determining the associated intermediate representation, and receiving and optimizing the at least one rendering parameter are performed by a graphics processing unit.

14. A system for rendering of an overlay of a medical image from data obtained from a medical scanner with a reference image, the system comprising:

a first interface configured to receive the reference image, wherein the reference image comprises at least one reference structure of a body;

a first processing unit configured to determine an intermediate representation of the at least one reference structure in the received reference image;

a second interface configured to receive the medical image from the medical scanner, wherein the medical image comprises, at least partially, structures of a patient's body corresponding to the at least one reference structure of the received reference image;

a second processing unit configured to determine an intermediate representation of at least part of the structures in the received medical image;

a third interface configured to receive at least one rendering parameter for rendering the received medical image;

a third processing unit configured to optimize the received at least one rendering parameter for aligning and overlaying the received medical image with the received reference image, wherein the optimization comprises comparison of the intermediate representation of the received medical image with the intermediate representation of the received reference image;

a fourth processing unit configured to align and overlay the received medical image with the received reference image based on the optimized at least one rendering parameter; and a fourth interface configured to output the aligned and overlayed medical image with the reference image for rendering.

15. The system of claim 14, further comprising:

the medical scanner, the medical scanner comprising a surgical camera, an ultrasound scanner, a positron emission tomography scanner, an x-ray imaging scanner, a computed tomography scanner, or a magnetic resonance tomography scanner;

a renderer configured to render the aligned and overlayed medial image with the reference image; and a display configured to display the rendered medial image with the reference image, the display comprising a screen, a stereoscopic display, a virtual reality display, or an augmented reality headset;

wherein the reference image comprises a cryosection image data set, a synthetically generated image, or an image received from the medical scanner or another medical scanner;

wherein the intermediate representation of the at least one reference structure and/or the intermediate representation of the structures of the at least one medical image is a segmentation, a mesh, an isosurface, or a point cloud; and wherein the at least one rendering parameter comprises a view position, a field of view, a view orientation, a depth of field, and/or a lighting.

16. The system of claim 14, wherein at least one of the received reference image and the received medical image comprises a series of non-static images received from the medical scanner in real-time during an interventional procedure.

17. The system of claim 14, wherein the third processing unit is configured to compare the intermediate representation of the received medical image with the intermediate representation the received reference image by generation a function of a difference of at least one property of the intermediate representation of the received medical image and of the intermediate representation of the received reference image, and wherein the optimization of the at least one rendering parameter comprises determination of at least one partial derivative of the generated function with respect to the at least one rendering parameter.

18. A system for rendering of an overlay of a medical image from data obtained from a medical scanner with a reference image, the system comprising:

a reference database for providing at least one reference image;

a medical scanner for providing at least one medical image;

a computer, wherein a first interface is configured to receive the at least one reference image from the reference database, and a second interface is configured to receive the at least one medical image from the medical scanner;

a processor is configured to optimize a rendering parameter for aligning and overlaying the received at least one medical image with the received at least one reference image, wherein the optimization comprises comparison of an intermediate representation of structure in the received medical image with an intermediate representation of the structure in the received reference image, the processor configured to align and overlay the received at least one medical image with the received at least one reference image based on the optimized rendering parameter; and a renderer configured to render the aligned and overlaid at least one medical image with the at least one reference image.

* * * * *